(12) United States Patent
Ettes et al.

(10) Patent No.: US 11,516,895 B2
(45) Date of Patent: Nov. 29, 2022

(54) DEVICE AND METHOD FOR WIRELESS POWER TRANSFER

(71) Applicant: KONINKLIJKE PHILIPS N.V., Eindhoven (NL)

(72) Inventors: Wilhelmus Gerardus Maria Ettes, Leeuwarden (NL); Klaas Kooijker, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 28 days.

(21) Appl. No.: 17/043,878

(22) PCT Filed: Apr. 2, 2019

(86) PCT No.: PCT/EP2019/058329
§ 371 (c)(1),
(2) Date: Sep. 30, 2020

(87) PCT Pub. No.: WO2019/193019
PCT Pub. Date: Oct. 10, 2019

(65) Prior Publication Data
US 2021/0037618 A1  Feb. 4, 2021

(30) Foreign Application Priority Data
Apr. 3, 2018 (EP) .................................... 18165430

(51) Int. Cl.
*H02J 50/12* (2016.01)
*H05B 6/12* (2006.01)
(Continued)

(52) U.S. Cl.
CPC .......... *H05B 6/1236* (2013.01); *H02J 50/005* (2020.01); *H02J 50/12* (2016.02); *H02J 50/50* (2016.02); *H05B 6/1263* (2013.01)

(58) Field of Classification Search
CPC ... H05B 6/00; H02J 50/12; H02J 50/50; H02J 50/005
See application file for complete search history.

(56) References Cited

U.S. PATENT DOCUMENTS 9,295,110 B2 * 3/2016 Matsui ................. H05B 6/1263
9,866,073 B2   1/2018 Joye et al.
(Continued)

FOREIGN PATENT DOCUMENTS

DE    29703787 U1   5/1997
JP    2010219071 A  9/2010
(Continued)

OTHER PUBLICATIONS

Search Report and Written Opinion from PCT/EP2019/058329 dated Jun. 18, 2019.

*Primary Examiner* — Rexford N Barnie
*Assistant Examiner* — Joseph N Inge

(57) ABSTRACT

An intermediate device for supporting a power transfer to an electromagnetic load (505) from a power transmitter (201) providing a power transfer electromagnetic signal comprises a resonance circuit (507) that includes a coil (701) and a capacitor (703). The coil (701) is arranged to electromagnetically couple to the power transmitter (201) and to the electromagnetic load (505) such that energy of the power transfer electromagnetic signal from the power transmitter (201) is concentrated towards the electromagnetic load (505). A hollow support structure (1001) has a laterally positioned air inlet (1205) and a centrally positioned air outlet (1207). The coil (701) is mounted on the hollow support structure (1001) and disposed around the central air outlet (1207). The device further comprises an air flow generator (901) for creating a flow of air into the air inlet (1205).

15 Claims, 15 Drawing Sheets

(51) Int. Cl.
*H02J 50/50* (2016.01)
*H02J 50/00* (2016.01)

(56) References Cited

U.S. PATENT DOCUMENTS

| | | | |
|---|---|---|---|
| 10,090,884 B2 | 10/2018 | Ettes et al. | |
| 10,097,040 B2 | 10/2018 | Van Wageningen et al. | |
| 10,312,750 B2 | 6/2019 | Boer et al. | |
| 10,439,436 B2 | 10/2019 | Van Wageningen et al. | |
| 2013/0264334 A1* | 10/2013 | Kwon | F24C 15/101 |
| | | | 219/623 |
| 2014/0191717 A1 | 7/2014 | Hong et al. | |
| 2016/0294219 A1* | 10/2016 | Van Wageningen | H02J 50/10 |
| 2017/0257913 A1* | 9/2017 | Vengroff | H05B 6/1209 |
| 2017/0326992 A1* | 11/2017 | Budhia | H02J 50/10 |
| 2019/0014683 A1* | 1/2019 | Han | H02J 7/0027 |
| 2019/0044383 A1* | 2/2019 | Van Wageningen | H02J 5/005 |
| 2020/0021136 A1* | 1/2020 | Suga | H02J 50/12 |

FOREIGN PATENT DOCUMENTS

| | | | | |
|---|---|---|---|---|
| WO | 20170190603 A1 | 11/2017 | | |
| WO | WO-2017190603 A1 * | 11/2017 | | H02J 50/10 |

* cited by examiner

DEVICE AND METHOD FOR WIRELESS POWER TRANSFER

CROSS-REFERENCE TO PRIOR APPLICATIONS

This application is the U.S. National Phase application under 35 U.S.C. § 371 of International Application No. PCT/EP2019/058329, filed on Apr. 2, 2019, which claims the benefit of EP Patent Application No. EP 8165430.2, filed on Apr. 3, 2018. These applications are hereby incorporated by reference herein.

FIELD OF THE INVENTION

The invention relates to wireless power transfer, and in particular, but not exclusively, to wireless power transfer for heating appliances.

BACKGROUND OF THE INVENTION

Most present day electrical systems and devices require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi Specifications further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions.

The Qi Specification supports communication from the power receiver to the power transmitter thereby enabling the power receiver to provide information that may allow the power transmitter to adapt to the specific power receiver. In the current Specification, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

Starting from the Qi specification, a new specification is being developed to support increasingly high power demanding applications. For example, the Specification is intended to be used with devices consuming several kilowatts of power. In addition, new wireless power transfer specifications and standards are being developed to address such higher power applications.

For example, the wireless power transfer is expected to increasingly be used with e.g. kitchen appliances such as kettles, blenders, food processors etc. In particular, wireless power transfer is envisaged for providing power to various heating devices. For example, the concept is expected to be widely used e.g. in cooking stoves supporting kettles and pans that are heated by means of magnetic induction.

As an example, FIG. 1 illustrates a wireless power provision to a heating appliance (such as a pan or a kettle).

In the example, the power providing apparatus comprises a power transmitter 101 which is shown as being sub-divided into a power source 103, a transmitter coil 105, and an inverter 107 receiving power from the power source 103 and generating a drive signal for the transmitter coil 105. The transmitter coil 105 is located close to, or integrated within, a kitchen worktop 109. A heating appliance 111, such as a kettle, is positioned on the worktop and comprises a heating element 113 in which the power transmitter 101 may induce eddy currents which result in the heating element heating up.

The bottom of the pan or kettle may get very hot. However, the worktop may be made from a material that is not resistant to such high temperatures. For example, typical kitchen worktops may be made from materials such as wood or granite. However, these materials may have a much lower heat resistance and may potentially even be damaged if subjected to the high temperatures of the kettle.

Indeed, generally, the increased flexibility and variation of applications of wireless power transfer at increasingly high power levels (where in particular the power transfer may support heated power consuming devices) has led to increased risks and complications. This may in particular be the case for kitchen scenarios using wireless power transfer but is not limited to such applications.

In order to support such temperature applications, it has in WO2015062947A1 and WO2017134101A1 been suggested that a thermal barrier capable of protecting the worktop surface may be introduced.

It is furthermore suggested that that thermal barrier includes a power repeater for focusing the electrical field towards the appliance (to compensate for the additional distance Z between the power transmitter and the appliance) and that an over-temperature protection may be provided by this power repeater being arranged to reduce the magnetic field strength if the temperature rises above a threshold. Indeed, such a power repeating approach has been proposed to be used to provide an intermediate device (which may or may not function as a thermal barrier) which can be positioned between the power transmitter and the powered appliance and which can provide some of the control functionality required for the power transfer. This may for example allow Qi wireless transmitters to be used with power receivers that do not have the required Qi functionality. Indeed, it may even allow a conventional device (such as pan) to be used with a Qi power transmitter with the Qi power transfer control being provided by the intermediate device and the provided power transfer signal simply inducing Eddy currents in a metal heating element of the pan thereby causing a heating of the pan.

Thus, an intermediate device may provide a number of advantages and options. However, whereas such an approach may provide improved support for wireless powering of e.g. kitchen appliances, there are still a number of outstanding problems, issues, and challenges.

A particular problem has been found to be the thermal design for such a power repeating intermediate device. It has been found that the larger distance between the cordless power transmitter and the powered appliance requires an increased current thought the power transmitter coil to generate a stronger magnetic field. Although this issue may be mitigated by the provision of a power repeating coil in the intermediate device, this will tend to require a strong current running in the power repeating coil. Due to the inevitable ohmic resistance of this, a substantial amount of power may be dissipated in the coil resulting in not only a reduced efficiency but also in the coil potentially becoming very hot. In particular, hotspots may often result with many practical thermal designs. This may not only result in increased temperatures but may effectively limit the maximum distance that can be bridged by the device.

Hence, an improved wireless power transfer approach would be advantageous and in particular an approach allowing an (intermediate) device coupling an electromagnetic load to a power transmitter with the device providing increased flexibility, improved support for different applications and usage scenarios, improved thermal design, increased power handling capability, reduced cost, reduced complexity and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided device for supporting a power transfer to an electromagnetic load from a power transmitter providing a power transfer electromagnetic signal; the device comprising: a resonance circuit including a coil and a capacitor, the coil being arranged to electromagnetically couple to the power transmitter through a first surface area and to the electromagnetic load through a second surface area; the resonance circuit being arranged to concentrate energy of the power transfer electromagnetic signal from the power transmitter towards the electromagnetic load by concentrating energy of the power transfer electromagnetic signal from the first surface area towards the second surface area; a hollow support structure having a laterally positioned air inlet and a centrally positioned air outlet, the coil being mounted on the hollow support structure and disposed around the central air outlet; and an air flow generator for creating a flow of air into the air inlet.

The invention may provide improved operation in many embodiments, and may in particular provide efficient cooling for a (power repeating) coil in an intermediate device between a power transmitter and an electromagnetic load. The coil will for clarity also be referred to as the repeater coil. Similarly, the device may be referred to as the intermediate device.

The approach may in many embodiments and situations provide advantageous positioning of the repeater coil for extending the range from the electromagnetic load to the power transmitter. The approach may allow such an arrangement to be used with substantially higher power levels and field strengths. It may provide improved cooling of the repeater coil thereby allowing losses in this to be increased, and thus allowing higher power transfer. The approach may reduce losses in the intermediate device and may in particular reduce losses in metallic parts of the air flow generator, such as losses due to Eddy currents in metallic parts of a fan.

The approach may in many scenarios provide an increasingly homogenous, and often symmetric, air flow, and may reduce the risk of thermal hotspots for the repeater coil. Often, a homogenous heat distribution across the area of the repeater coil can advantageously be achieved.

The coil may be disposed on the exterior of the hollow support structure, e.g. by being attached to an outer wall of the hollow support structure. The outer wall may typically be substantially planar and may typically be larger than the coil. In many embodiments, the wall on which the coil is mounted may be substantially circular and the coil may have circular windings.

The centrally positioned air outlet may be positioned closer to a center of the coil (and typically of the hollow support structure) than the laterally positioned air inlet. The centrally positioned air outlet may typically be positioned inside the innermost winding of the coil. The laterally positioned air outlet may typically be positioned outside the outermost winding of the coil.

The air flow generator may typically be a fan.

The coil is arranged to couple to the power transmitter through a first surface area (of the device) and to couple to the electromagnetic load through a second surface area (of the device) and the resonance circuit may be arranged to concentrate energy of the power transfer electromagnetic signal from the first surface area towards the second surface area.

The invention may allow improved flexibility and support for an increased variety of different usage scenarios for wireless power transfer. For example, it may provide improved support for e.g. kitchen usage scenarios.

The device may specifically be a thermal barrier and may provide protection for the power transmitter against high temperatures of the electromagnetic load. The device may allow e.g. electromagnetic loads heated by wireless power transfer to be used with wireless power transmitters associated with insufficient thermal protection while at the same time ensuring efficient power transfer.

The resonance circuit may operate as a power repeater arranged to concentrate energy/power of the power transfer electromagnetic signal from the first surface area towards the second surface area by being arranged to increase the magnetic flux density for the second surface area (compared to if the magnetic flux density if the power repeater, i.e. the resonance circuit, were not present). The resonance circuit may allow the device to be e.g. inserted between the power transmitter and the electromagnetic load while still allowing a strong magnetic field to be provided to the electromagnetic load. For example, using a conventional thermal barrier will in most scenarios result in a substantially degraded power transfer performance due to the increased distance and reduced coupling between the transmit coil of the power transmitter and the electromagnetic load. The device however may e.g. provide efficient thermal protection by allowing an increased distance between the transmit coil and the electromagnetic load while still ensuring an efficient effective coupling between the transmit coil and the electromagnetic load. In particular, the resonance circuit may concentrate the magnetic field such that an increased flux passes through the electromagnetic load, i.e. the flux density may be increased. The resonance circuit may concentrate the energy towards the second surface area by guiding, biasing, or moving magnetic field lines from the second electromagnetic signal towards the second surface area. The resonance circuit may effectively function as a magnetic lens. Specifically, it may deform the magnetic field from the power transmitter to provide an increased flux through the second surface area/the electromagnetic load. It may thus increase the magnetic flux density for the second surface area.

The first surface area and the second surface area may be on opposing (and possibly substantially parallel) surfaces of the device. However, this is not a necessity, and in some embodiments the first and second surfaces may not be parallel with each other, and may not necessarily be opposing surfaces. For example, for a cube shaped device, the second surface may be a top surface and the first surface may be an adjacent side surface. The coil may in such embodiments concentrate energy/field lines from the side surface to the top surface.

In many embodiments, the coil may be positioned between the first surface and the second surface.

The first surface area may specifically be arranged to couple to the power transmitter by being arranged to receive the power transmitter. The first surface area may be arranged to touch, attach, connect to, or rest on a surface of the power transmitter, or may provide a surface area for the power transmitter to be positioned on or to be positioned on the power transmitter.

The second surface area may specifically be arranged to couple to the electromagnetic load by being arranged to receive the electromagnetic load. The second surface area may be arranged to touch, attach, connect to, or rest on a surface of the electromagnetic load, or may provide a surface area for the electromagnetic load to be positioned on or for the power transmitter to be positioned on.

The first surface area and the second surface area may be outside surface areas of opposite walls of an enclosure of the device.

The electromagnetic load may be an entity extracting power from the power transfer electromagnetic signal. The electromagnetic load may specifically be a power receiver, potentially (at least partly) without functionality for interacting with the power transmitter. The electromagnetic load provides a loading of the power transfer electromagnetic signal. In this way, power may transferred directly from the power transmitter to the electromagnetic load by the power transfer electromagnetic signal without any intermediate conversion to electrical energy. The electromagnetic load loads the magnetic field generated by the power transfer signal. Thus, the power transfer magnetic field/signal causes current to be induced in the electromagnetic load resulting in power being extracted from the field by the electromagnetic load.

The electromagnetic load may in some embodiments comprise or consist in a conductive element, and specifically a conductive heating element. Specifically, the power may be received by the power transfer electromagnetic signal causing Eddy currents in a conductive element of the electromagnetic load. The electromagnetic load may in many embodiments be a heating plate, e.g. of a pan, kettle, pot or similar kitchen heating appliance.

In accordance with an optional feature of the invention, the device further comprises an air flow guide opposing the air outlet and arranged to direct air flow over the coil.

This may provide an improved thermal design while allowing a low complexity implementation. In particular, it may in many implementations improve the airflow over the coil and improve cooling of this.

The air flow guide opposing (facing/opposite) the air outlet may be such that the air flow from the air outlet is redirected by the air flow guide to flow over the coil. The air flow guide may redirect air flow to be more along the direction of the extension of the coil than orthogonal to this direction. The air flow guide may in many implementations together with the hollow support structure (and the coil) form an air conduit in which the coil is positioned such that air from the air outlet will flow in the conduit such that it traverses/flows over at least part of the coil.

The air flow guide may be an element having a side positioned substantially parallel to a surface of the hollow support structure which supports the coil.

The distance from the coil to the air flow guide may in many embodiments advantageously be no less than 1 mm and no more than 20 mm. This may typically provide an efficient and high rate air flow resulting in an effective cooling.

In accordance with an optional feature of the invention, the air flow guide is formed by a wall of an enclosure of the device.

This may provide a particularly efficient and low complexity implementation.

In accordance with an optional feature of the invention, the hollow support structure is at least partially formed by opposing walls connected by a side wall, the coil being disposed on an outside of a first wall of the opposing walls and the air outlet being formed in the first wall.

This may provide a particularly efficient and advantageous implementation in many embodiments.

In accordance with an optional feature of the invention, a second wall of the opposing walls is formed by a part of an enclosure of the device.

This may in many embodiments provide a particularly efficient and low complexity, and typically low cost, implementation.

In accordance with an optional feature of the invention, the air inlet is at least partially formed in the side wall.

This may allow a particularly advantageous implementation in many embodiments.

In accordance with an optional feature of the invention, only the first wall of the opposing walls comprises any air outlets.

This may allow a particularly advantageous implementation in many embodiments. It may in many embodiments reduce complexity and/or provide improved air flow for cooling.

In accordance with an optional feature of the invention, the device further comprises a communication antenna disposed around the side wall.

The approach may provide advantageous implementation and support for both communication and power repeating coils. The communication antenna may specifically be a communication coil. The communication coil may be formed by windings attached/mounted to the side wall. The communication coil may specifically be an NFC coil.

In accordance with an optional feature of the invention, the air inlet is outside an external periphery of the coil.

This may be particularly advantageous in many embodiments. The external periphery of the coil may correspond to the outside winding of the coil.

In accordance with an optional feature of the invention, the hollow support structure comprises only a single air inlet.

This may allow a particularly advantageous implementation in many embodiments. It may in many embodiments reduce complexity and/or provide improved air flow for cooling.

In accordance with an optional feature of the invention, the hollow support structure comprises only a single air outlet.

This may allow a particularly advantageous implementation in many embodiments. It may in many embodiments reduce complexity and/or provide improved air flow for cooling.

In accordance with an optional feature of the invention, the hollow support structure may be substantially cylindrical with the coil being disposed on a flat surface of the hollow support structure.

The hollow support structure 1001 may in many embodiments have a diameter no less than 5 cm and no more than 30 cm, and/or a height no less than 1 cm and no more than 5 cm.

In accordance with an optional feature of the invention, the air outlet is formed inside an innermost winding of the coil.

This may allow a particularly advantageous implementation in many embodiments. It may in many embodiments reduce complexity and/or provide improved air flow for cooling.

According to an aspect of the invention there is provided a method of supporting a power transfer to an electromagnetic load from a power transmitter providing a power transfer electromagnetic signal; the method comprising: providing a resonance circuit including a coil and a capacitor, the coil being arranged to electromagnetically couple to the power transmitter through a first surface area and to the electromagnetic load through a second surface area; the resonance circuit concentrating energy of the power transfer electromagnetic signal from the power transmitter towards the electromagnetic load by concentrating energy of the power transfer electromagnetic signal from the first surface area towards the second surface area; providing a hollow support structure having a laterally positioned air inlet and a centrally positioned air outlet; the coil being mounted on the hollow support structure and disposed around the central air outlet; and an air flow generator creating a flow of air into the air inlet.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a kitchen application, and in particular to a wireless power transfer to a heating element of a kitchen appliance, such as a pan. However, it will be appreciated that the invention is not limited to this application but may be applied to many other applications and wireless power transfer systems. The description will also focus on embodiments compatible with many aspects of Qi wireless power transfer systems but it will be appreciated that this is merely for an example and that the described principles and approaches are not limited to such an application.

Figure 2:
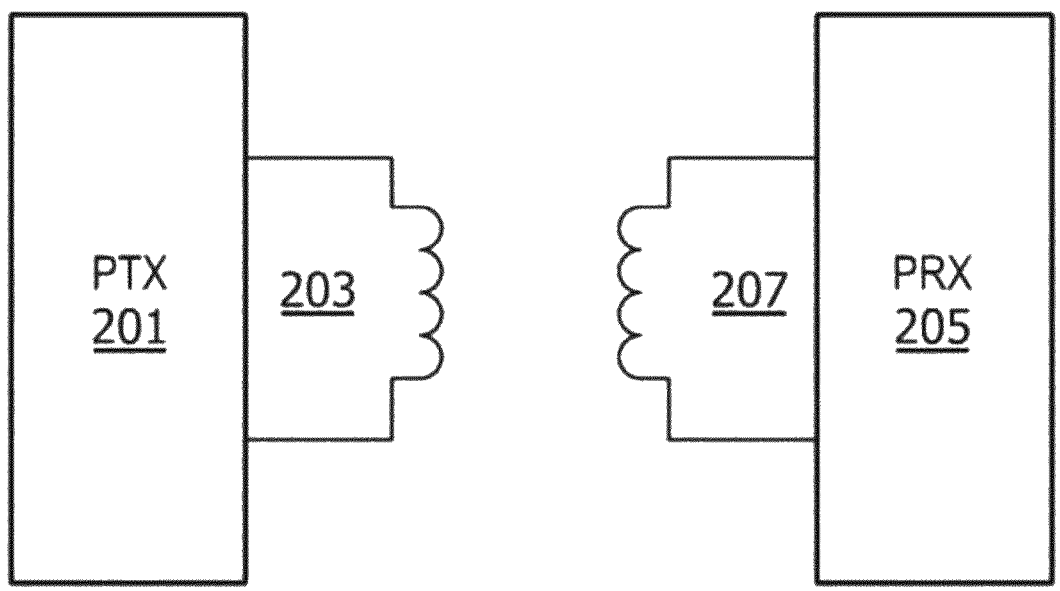
FIG. 2 is an illustration of a wireless power transfer system.

FIG. 2 illustrates an example of a power transfer system. The power transfer system comprises a power transmitter 201 which includes (or is coupled to) a transmitter coil/inductor 203. The system further comprises a power receiver 205 which includes (or is coupled to) a receiver coil/inductor 207.

The system provides a wireless inductive power transfer from the power transmitter 201 to the power receiver 205. Specifically, the power transmitter 201 generates a power transfer electromagnetic signal (which for brevity will also be referred to as a power signal or a power transfer signal) which is propagated as a magnetic flux by the transmitter coil 203. The power signal may typically have a frequency between around 20 kHz to 200 kHz. The transmitter coil 203 and the receiver coil 207 are loosely coupled and thus the receiver coil 207 picks up (at least part of) the power signal from the power transmitter 201. Thus, the power is transferred from the power transmitter 201 to the power receiver 205 via a wireless inductive coupling from the transmitter coil 203 to the receiver coil 207. The term power signal/power transfer signal or power transfer electromagnetic signal may be used to refer to the magnetic or inductive signal between the transmitter coil 203 and the power receiving entity (the magnetic flux signal), and thus refer to the inductive power transfer achieved using the electromagnetic field. It will be appreciated that by equivalence the term may also be considered, and used, as a reference to the electrical signal provided to the transmitter coil 203.

In the following, the operation of the power transmitter 201 and the power receiver 205 will be described with specific reference to the Qi Specification. In particular, the power transmitter 201 and the power receiver 205 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 201 is in the selection phase wherein it merely monitors for the potential presence of a power receiver. The power transmitter 201 may use a variety of methods for this purpose, e.g. as described in the Qi wireless power specification. If such a potential presence is detected, the power transmitter 201 enters the ping phase wherein a power signal is temporarily generated. The power receiver 205 can apply the received signal to power up its electronics. After receiving the power signal, the power receiver 205 communicates an initial packet to the power transmitter 201. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 205 is present at the interface of the power transmitter 201.

Upon receiving the signal strength message, the power transmitter 201 moves into the Identification & Configuration phase. In this phase, the power receiver 205 keeps its output load disconnected and communicates to the power transmitter 201 using load modulation. The power transmitter 201 provides a power signal of constant amplitude, frequency and phase for this purpose (with the exception of the change caused by load-modulation). The messages are used by the power transmitter 201 to configure itself as requested by the power receiver 205. The messages from the power receiver 205 are not communicated continuously but are communicated in intervals.

Following the Identification and Configuration phase, the system moves on to the power transfer phase where the actual power transfer takes place. Specifically, after having communicated its power requirement, the power receiver 205 connects the output load and supplies it with the received power. The power receiver 205 monitors the output load and measures the control error between the actual value and the desired value of a certain operating point. It communicates such control errors to the power transmitter 201 at a minimum rate of e.g. every 250 ms to indicate these errors to the power transmitter 201 as well as the desire for a change, or no change, of the power signal. Thus, in the power transfer phase, the power receiver 205 also performs load modulation of the power signal in load modulation intervals in order to communicate information to the power transmitter 201. It will be appreciated that other communication approaches may alternatively or additionally be used.

Figure 3:
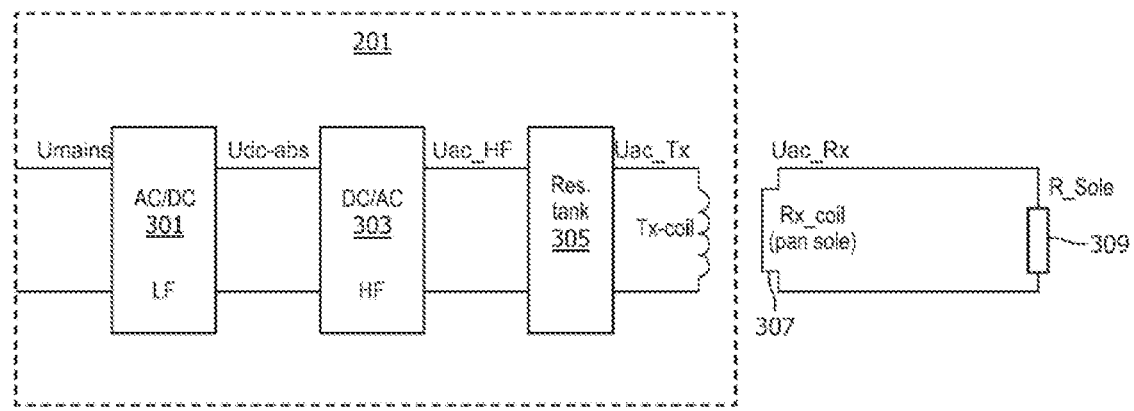
FIG. 3 is an illustration of a power path of a wireless power transfer system.

FIG. 3 illustrates an example of a power supply path for providing a power transfer to an electromagnetic load, such as specifically a heating element (e.g. a pan sole). The heating element may simply be a metal object/block/volume/article/part. The power provision comprises a power transmitter 201 is as described with reference to FIG. 2. The power transmitter 201 comprises a power source 301 in the form of an AC/DC converter which rectifies the input ac voltage (e.g. the mains). The rectified mains signal is fed to a DC/AC converter in the form of an inverter 303 which generates a high frequency drive signal that is fed to a resonant tank 305 (a tuned L-C circuit) including a transmitter coil. The system includes an electromagnetic load in the form of a heating pan. The electromagnetic load can be represented by a receiver coil 307 and a load R_Sole 309 (representing the loading of the electromagnetic load and specifically the Eddy current losses in heating element (pan sole)).

Figure 4:
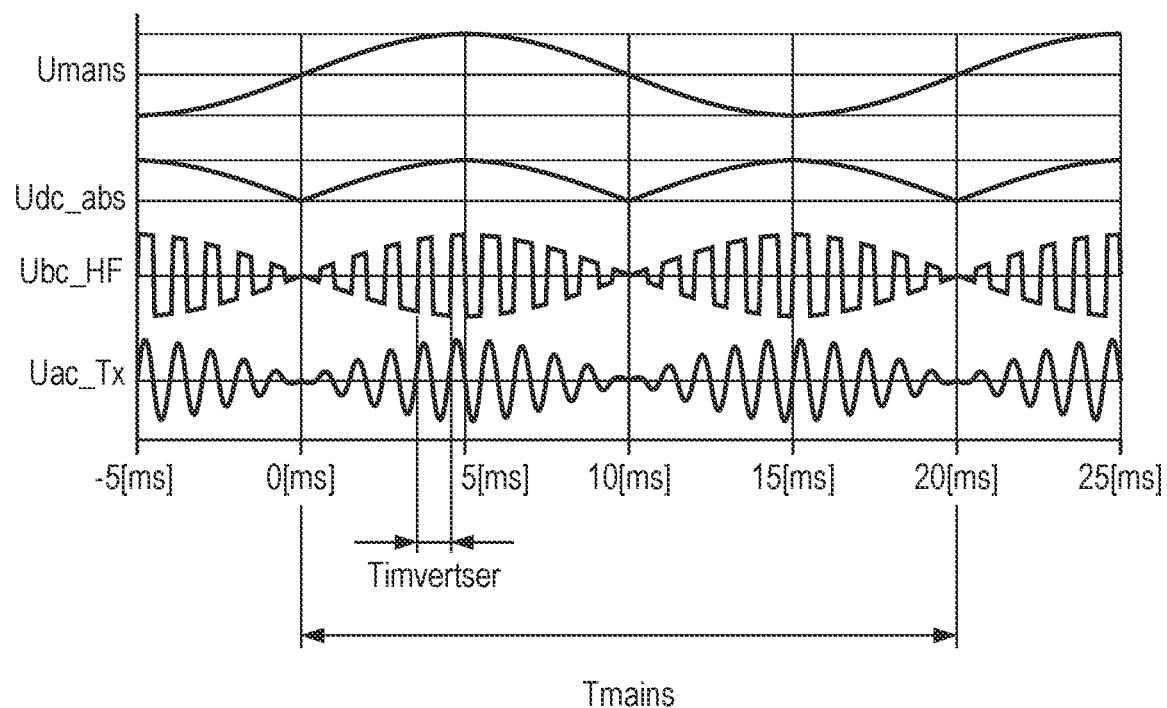
FIG. 4 is an illustration of some voltage waveforms of a power path of a wireless power transfer system.

FIG. 4 illustrates the voltage waveforms of the power path of FIG. 3. The mains voltage Umains is rectified by the AC/DC converter 303 to the voltage Udc_abs. A large storage capacitor, which is used to buffer the rectified mains voltage, is normally not applied in these kinds of applications since it will add to the total mains harmonic distortion of this application. As a result, a varying DC voltage is generated by the AC/DC converter 303.

Because of the characteristics of the rectified voltage Udc_abs, the output voltage Uac_HF of the inverter 303 is shaped as shown in FIG. 4. The normal operating frequency of the inverter is in the order of 20 kHz to 100 kHz.

The transmitter coil, together with the receiver coil 307 and resistance R_Sole 309, is essentially the load of the inverter 303. However, due to the nature of this load (both inductive and resistive) a resonant circuit is typically used in between the inverter 303 and this load in order to cancel the inductive part of the load. Furthermore, the resonant network typically results in a reduction in the switching losses of the inverter 303.

In the example, the power transmitter 201 thus does not transfer power to a conventional power receiver for provision of electrical power to an external load but instead provides a power to an electromagnetic load which directly extracts energy from the electromagnetic field generated by the power transfer system. The electromagnetic load may specifically comprise or consist in a conductive element in which the electromagnetic signal generates Eddy currents which then generate heat.

Further, in many embodiments, the electromagnetic load device or entity may comprise no functionality for communicating with the power transmitter, and thus no functionality for controlling the power transfer operation. Indeed, the electromagnetic load may simply be a conductive element such as a heating plate with no associated electronics or functionality.

The same power transmitter 201 may accordingly be used in different scenarios. Specifically, it may be used with a conventional power receiver 205 is in the example of FIG. 2 or it may be used with a simple electromagnetic load which has limited or possibly no functionality for interfacing with the power transmitter 201.

In an exemplary scenario, the power transmitter 201 may be used in a kitchen environment to provide wireless power to various kitchen appliances including blenders, food processors, kettles, pots, pans etc. In the example, the power transmitter 201 may be part of a group of power transmitters that may simultaneously provide power to a plurality of appliances. Some of the power transmitters may be provided in a cooking zone that is made from heat resistant materials (such as a ceramic material). Others of the power transmitters may be provided in a preparation zone that is made from a material that is not heat resistant (such as e.g. a kitchen worktop made from wood). Thus, the user may be in a situation wherein he may have a number of power positions available of which some may be suitable for appliances that may get hot whereas other power positions may be unsuitable for these positions. However, it may at times be useful for the user if these positions could also be used for providing power to heating appliances that may become hot.

Figure 1:
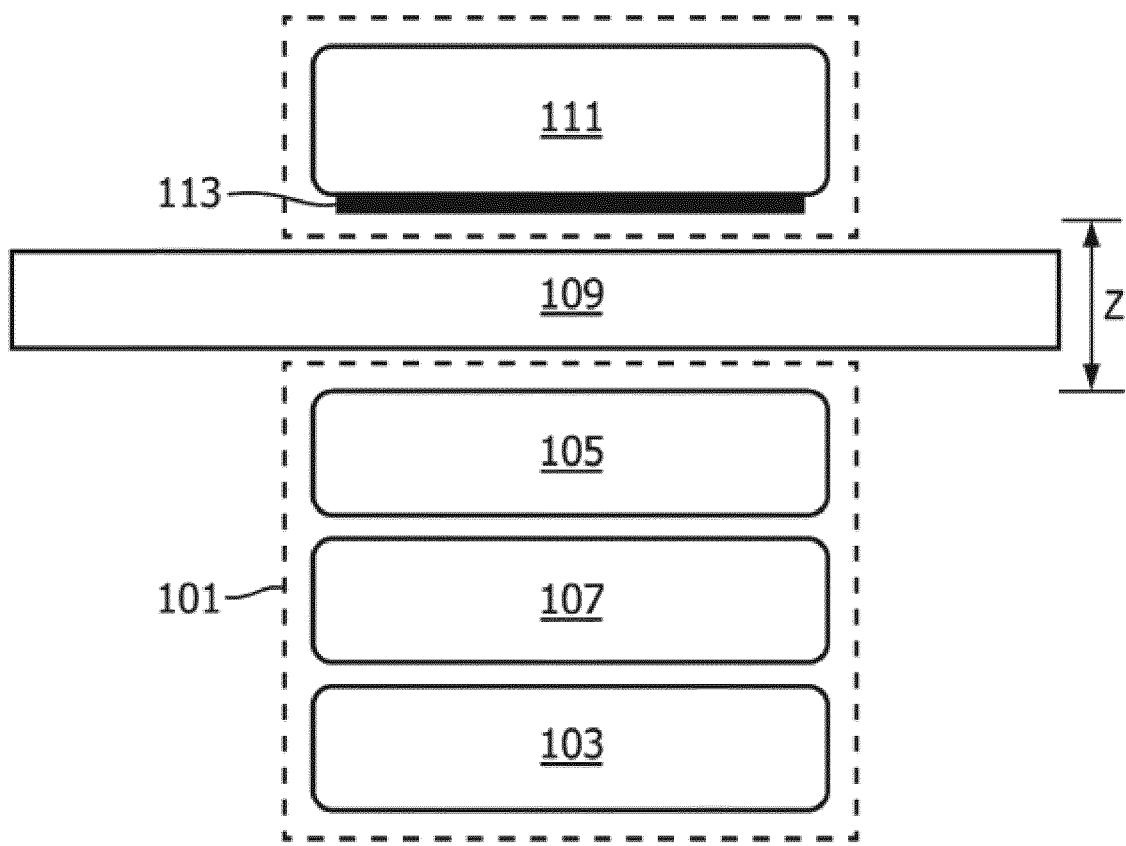
FIG. 1 is an illustration of a wireless power transfer system.

Specifically, the power transmitter 201 may be positioned immediately below (or be part of) a non-heat resistant worktop thereby rendering it unsuitable for heating appliances such as kettles, pots and pans. However, it may be desirable to use this power transmitter to power such heating appliances, and specifically heating appliances which may provide heat by the induction of Eddy currents in a conductive heat element. However, in order to maximize the power efficiency such heating elements may often be positioned at the part of the appliance which is in closest contact with the power transmitter. Specifically, for a power transmitter in a worktop surface, the appliance may be designed with the heating element at the bottom. In use, the heating element will accordingly also come into contact with the worktop surface (as illustrated in FIG. 1). This may cause damage to the worktop which typically will not be made heat resistant.

Figure 5:
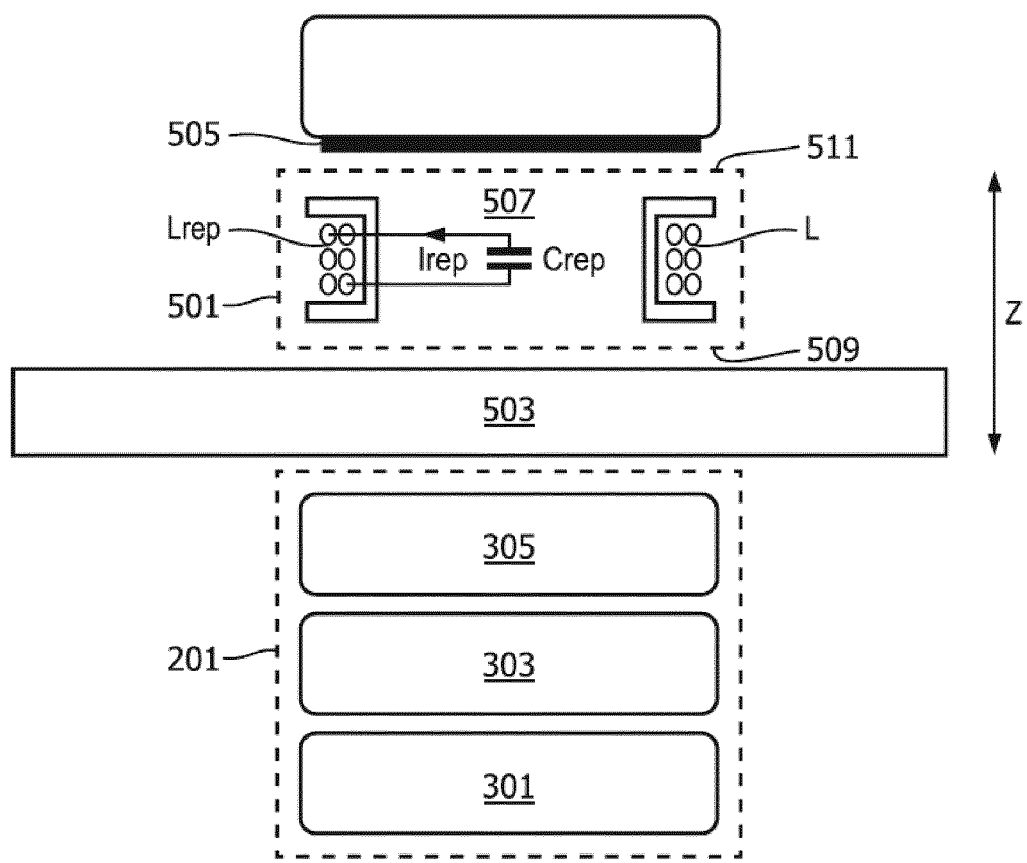
FIG. 5 is an illustration of a wireless power transfer system in accordance with some embodiments of the invention.

In order to address this issue, an intermediate device 501, which may form a thermal barrier, may be introduced between the worktop 503 and the heating plate/electromagnetic load 505 as illustrated in FIG. 5. The intermediate device 501 may be made from a suitable heat resistant material, such as from a suitable ceramic material. The intermediate device 501 may for example be implemented as a coaster or trivet that the user can put on the worktop, with the appliance (e.g. pot or pan) then being positioned on the coaster/trivet by the user.

However, although this may allow the non-protected power position (the power transmitter) to be used for powering heating devices, it will typically also substantially increase the distance Z between the power transmitter 201 and the electromagnetic load 201. Thus, the distance between the power transmitter coil and the heating plate will be substantially increased resulting in a substantially reduced coupling between these.

This will result in a requirement for higher currents in the power transmitter coil 305 in order to realize the same amount of magnetic flux field to be captured by the electromagnetic load 505. The higher currents cause more losses in the inverter 303 and transmitter coil 305. Also, the higher currents and the increased distance between power transmitter 201 and electromagnetic load 505 will result in more leakage flux. This leads to problems with Electromagnetic Interference (EMI) and Electromagnetic Force (EMF). For example, the International Electro technical Commission (IEC) sets international standards for radiated and conducted electromagnetic interference which must be taken into account for a wireless power transfer system, and these requirements may be increasingly difficult to meet when the distance between power receiver and power transmitter is increased.

In order to address such issues, an intermediate device 501 in accordance with some embodiments of the invention may comprise a resonance circuit including an inductor and a capacitor. The resonance circuit may effectively function as a power repeater directing the magnetic field towards the electromagnetic load. The resonance circuit may often be formed by a single inductor and a single capacitor. However, it will be appreciated that in some embodiments the resonance circuit may include a plurality of inductors and/or capacitors. Typically, such circuits are equivalent to a resonance circuit comprising a single capacitor and inductor. It will also be appreciated that the resonance circuit may include other components, such as e.g. resistors or sometimes switch elements.

Figure 6:
FIG. 6 is an illustration of an example of a power repeater for a wireless power transfer system in accordance with some embodiments of the invention.

Typically, the circuit may form a simple (equivalent) parallel resonant circuit such as is illustrated in FIG. 6 (shown both schematically and with a cross-sectional view of the inductor).

It will be appreciated that these issues are not specific to the intermediate device 501 forming a thermal barrier but will also be appropriate when the intermediate device 501 does not provide a thermal barrier. For example, the intermediate device 501 may be made from the same material as the worktop 503 (specifically wood) and only be used for low temperature heating applications (or for non-heating applications). Indeed, in some embodiments, it may even be acceptable for an intermediate device 501 to be used which will be damaged by the heating element. For example, it may be made from the same material as the worktop 503 but it may be acceptable for this to e.g. be marked due to excessive heating as it in contrast to the worktop 503 may be low cost and easily replaceable. Thus, the presence or function of a thermal barrier of the intermediate device 501 may be advantageous in many embodiments but is by no mean essential and may be avoided in many practical embodiments.

As another example, the intermediate device may be a device that provides missing functionality for supporting power transfer in accordance with the employed approach and protocol. For example, for the power receiver/electromagnetic load may be a simple power extracting inductor without having any Qi control functionality. In that case, an intermediate device may be introduced to include this functionality thereby enabling the power receiver to be used with a Qi wireless transmitter. However, similarly to a thermal barrier approach, such a control function intermediate device to be positioned between the power transmitter and the power receiver will increase the distance between the power transmitter coil 103 and the electromagnetic load. This may be addressed by including a power repeating resonance circuit in the intermediate device.

FIG. 5 illustrates the intermediate device 501 comprising a power repeater 507 comprising a resonance circuit, in this case formed by the inductor Lrep (shown in cross section) and the capacitor Crep.

The intermediate device 501 has a first surface area 509 which is in contact with the worktop 109 close to the power transmitter 101 when the system is in use. Thus, the intermediate device 501, and specifically the power repeater/resonance circuit 507 couples to the power transmitter 101 through the first surface area 509. The power transmitter 101 accordingly generates a first electromagnetic signal/field/flux to which the power repeater 507 couples predominantly via the first surface area 509.

Furthermore, the intermediate device 501 comprises a second surface area 511 which is intended to be in contact with the electromagnetic load 505 when in use. Specifically, the heating element of a heating device may be positioned on the second surface area 511.

The wireless power is provided to the electromagnetic load 505 through a second magnetic signal/field/flux which is predominantly provided through the second surface area 511. Thus, the coupling of the electromagnetic load 505 to the intermediate device 501/power repeater 507 is predominantly via the second surface area 511.

The second surface area 511 may specifically be arranged to couple to the electromagnetic load 505 by being arranged to receive the electromagnetic load. The second surface area 511 may be arranged to touch, attach, connect to, or rest on a surface of the electromagnetic load 505, or may provide a surface area for the electromagnetic load 505 to be positioned on.

The first surface area 509 may specifically be arranged to couple to the power transmitter 201 by being arranged to receive the power transmitter 201. The first surface area 509 may be arranged to touch, attach, connect to, or rest on a surface of the power transmitter 201, or may provide a surface area for the power transmitter 201 to be positioned on.

In the intermediate device 501, the resonance circuit includes an inductor and a capacitor where the inductor is arranged to couple to the power transmitter 201 through a first surface area 509 and to the electromagnetic load 505 through a second surface area 511. The resonance circuit has the effect of concentrating energy of the power transfer electromagnetic signal from the first surface area 509 towards the second surface area 511. Specifically, the resonance circuit has the effect of concentrating/increasing the electromagnetic flux density through the second surface area (compared to a situation where the resonance circuit were not present).

In the specific example, the majority of the magnetic flux reaching the power repeater/resonance circuit, and specifically the inductor Lrep, does so via the first surface area 509. This flux may be considered to correspond to a first magnetic signal. Similarly, the majority of the magnetic flux reaching the electromagnetic load 505 from the power repeater/resonance circuit, and specifically from the inductor L, does so via the second surface area 511. This flux may be considered to correspond to a second magnetic signal.

The depth of the intermediate device 501/thermal barrier is typically substantial, and indeed in many embodiments, the distance between the second surface area 511 and the first surface area 509 is at least 1 cm, 2 cm, 3 cm or even 5 cm. Such significant depths may provide a very efficient thermal insulation and protection. Indeed, it may typically allow very hot heating elements to be thermally isolated from thermally sensitive work surfaces. However, an associated disadvantage is that the direct coupling between the power transmitter 201 and the electromagnetic load 505 may be substantially reduced leading to increased power losses etc. In the described approach, these disadvantages are mitigated by the thermal barrier comprising the power repeater 507.

Specifically, the power repeater 507 is arranged to concentrate the energy of the second electromagnetic signal towards the second surface area 511. Specifically, the power repeater 507 may effectively act as a magnetic lens which concentrates the flux from the first electromagnetic signal to provide the second electromagnetic signal. The power repeater 507 achieves the concentration of the magnetic field by the resonance circuit oscillating with a current induced from the first electromagnetic signal. Effectively, the resonance circuit couples to the power transmitter 201 and to the electromagnetic load 505 thereby resulting in the magnetic flux from the power transmitter 201 being concentrated when provided to the electromagnetic load 505. The approach may allow the overall coupling between the power transmitter coil and the electromagnetic load 505 to be determined by the distances between the power transmitter coil and the power repeater 507 and between the power repeater 507 and the electromagnetic load 505 rather than by the total distance between the power transmitter coil and the electromagnetic load 505.

The resonance circuit may effectively bridge the distance between transmitter coil and the electromagnetic load (heating element) by resonating at or near the frequency of the power signal generated by the power transmitter. The resonance frequency frepeater of the resonance circuit can be determined by inductor Lrep and a capacitor Crep, using the following formula:

$$frepeater = \frac{1}{2*\pi*\sqrt{Lrep*Crep}}$$

The inductance value Lrep of the resonance circuit may be measured in air without the electromagnetic load or power transmitter 201 nearby. Typical values for Lrep and Crep may 200 uH and 200 nF respectively, which results in a resonance frequency frepeater of 25 KHz. However, it will be appreciated that the specific values will depend on the individual embodiments and the specific resonance frequency.

When the resonance frequency of the resonance circuit is tuned properly to the frequency of the power signal, a resonating current Irep is induced in the resonance circuit. Under this condition, the magnetic field lines inside the loop area are exactly in phase with the magnetic field lines generated by the power transmitter 201. As a consequence, the magnetic field lines of the first surface is guided towards the second surface, i.e. the magnetic field lines from the power transmitter 201 are guided towards the electromagnetic load 505.

In typical operation, the resonance frequency of the resonance circuit of the power repeater may shift e.g. due to the presence of the load, thermal variations etc. In some embodiments, the system, and in particular the power transmitter, may be arranged to dynamically adapt to such changes. For example, the operating/drive frequency may be adapted to match the shifted resonance frequency (e.g. based on finding an extremum for measurements of the effective impedance of the resonance circuit in the power transmitter).

Thus, the described approach may provide a means for e.g. using a thermal barrier to provide thermal insulation and protection between a power transmitter 201 and an electromagnetic load 505 while reducing and mitigating the impact on the power transfer. Specifically, the increased distance between the power transmitter 201 and the electromagnetic load 505 needed to create the thermal barrier is bridged by a power repeater within the volume of the thermal barrier.

In the example, the second surface area 511 and the first surface area 509 are on opposite surfaces of the intermediate device 501, i.e. they are opposite each other. However, it will be appreciated that whereas this may be a practical implementation in many scenarios, the geometric interrelation between the surfaces may be different in other embodiments.

Similarly, the first surface area 509 is in the example arranged to allow the intermediate device 501 to contact and specifically rest on the power transmitter 201/worktop. Similarly, the second surface area 511 is arranged to receive an electromagnetic load 505 which specifically is a heating appliance. The second surface area 511 may specifically be arranged for the electromagnetic load 505 to rest on when being powered. Furthermore, in the example, the second surface area 511 and the first surface area 509 are both substantially horizontal when in use. However, it will be appreciated that in other embodiments, the surfaces may have other characteristics and couple to the power transmitter 201 and electromagnetic load 505 in other ways.

In the system, the intermediate device 501 is a separate entity from the power transmitter 201 and the electromagnetic load 505. This may for example allow the intermediate device 501 to be implemented as a thermal barrier in the form of a trivet which can be placed on power provision positions of a kitchen preparation zone when these are used with heating appliances.

The intermediate device 501 may in this way provide thermal insulation and in addition, bridge the distance between power transmitter 201 and electromagnetic load 505 by a resonance coil (power repeater) that bridges the power signal to the cooking equipment. However, in addition to the (optional) thermal protection of the intermediate device (for which it is not an essential feature to provide thermal protection) and the improved power transfer efficiency achieved by the power repeater, the intermediate device 501 may further provide functionality assisting the operation and control of the power transfer.

Figure 7:
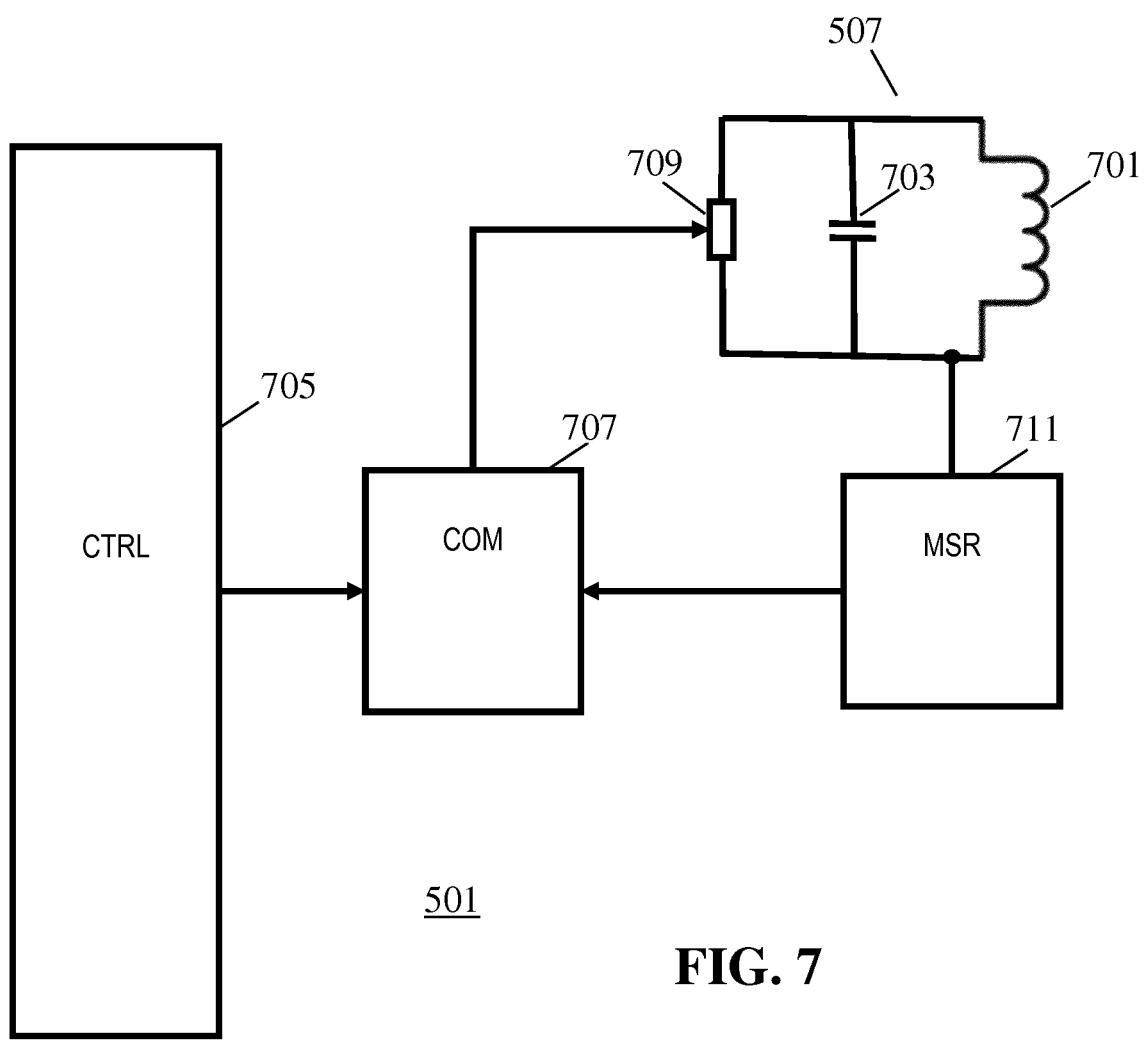
FIG. 7 is an illustration of an example of a power repeater for a wireless power transfer system in accordance with some embodiments of the invention.

FIG. 7 illustrates examples of some elements of the intermediate device 501 in accordance with some embodiments of the invention. The intermediate device 501 comprises the resonance circuit 507 comprising a coil 701 (Lrep) and capacitor 703 (Crep). As described, the resonance circuit 507 is arranged to concentrate the magnetic flux density through the second surface area 511, i.e. to concentrate the electromagnetic signal from the power transmitter 201 towards the electromagnetic load 505.

The intermediate device 501 further comprises a controller 705 which may be arranged to adapt the power control operation of the power transmitter 201 by exchanging one or more messages with the power transmitter 201.

The controller 705 is coupled to a communicator 707 which is arranged to exchange messages with the power transmitter 201. In the present example, the communicator 707 is arranged to transmit messages to the power transmitter 201 by load modulation of the power transfer electromagnetic signal generated by the power transmitter 201. Accordingly, the communicator 707 comprises a variable impedance 709 which loads the resonance circuit and in the specific example is coupled in parallel to the resonating components of the parallel resonance circuit. The variable impedance 709 is controlled by the communicator 707 which by changing the impedance can generate load modulation variations that can be detected by the power transmitter 201 as will be known to the skilled person.

In the example, the communicator 707 may also be arranged to receive messages from the power transmitter 201. In the example, the power transmitter 201 may communicate by modulating the power transfer electromagnetic signal, e.g. by applying an amplitude or frequency modulation.

The intermediate device 501 comprises a signal measurer 711 which is arranged to measure a property of a signal of the resonance circuit. For example, the inductor current may be measured. The signal measurer 711 may for example measure the instantaneous current amplitude or frequency and feed these values to the communicator 707 which may then proceed to demodulate the signal to generate the received messages.

In the example, the power transfer controller 705 may thus be arranged to control elements of the power transfer operation by exchanging messages with the power transmitter 201. The aspects of the power transfer operation controlled' and the messages employed to do so, will vary between different embodiments.

In many embodiments, the intermediate device 501 may be arranged to initiate or support initiation of a power transfer by exchanging messages that the electromagnetic load 505 is not capable of exchanging. For example, the power transmitter 201 may be arranged to transmit Identity and Configuration setup messages to initialize a power transfer.

Alternatively or additionally, the intermediate device 501 may be arranged to support the power transfer during the power transfer phase by exchanging power transfer phase messages that the electromagnetic load 505 is not capable of exchanging. For example, the intermediate device 501 may be arranged to transmit power control loop error messages during the power transfer phase.

Indeed, in some embodiments, the intermediate device 501 may be arranged to perform all the power transfer control and support required by the power transmitter 201, and indeed the intermediate device 501 may be the only device with which the power transmitter 201 interacts. Thus, in some embodiments, the electromagnetic load 505 may simply be a heating element, such as a conductive element, with no other functionality and the intermediate device 501 may provide all the functionality required by the power transmitter 201 for a power transfer operation. Indeed, the intermediate device 501 may in some such examples be effectively considered to implement a full power receiver functionality but with the actual core power extraction not being by the intermediate device 501 but instead being directly in the electromagnetic load 505 by this being exposed to the power transfer electromagnetic load 505.

An issue for an intermediate device comprising a power repeating resonance circuit as described is that quite high levels of current may typically flow in the repeater coil 701 which due to the inherent resistance of this will result in substantial power being dissipated in the repeater coil 701 resulting in a significant heating. Accordingly, efficient cooling of the repeater coil 701 is paramount and an efficient thermal design is imperative for high power operation.

Figure 8:
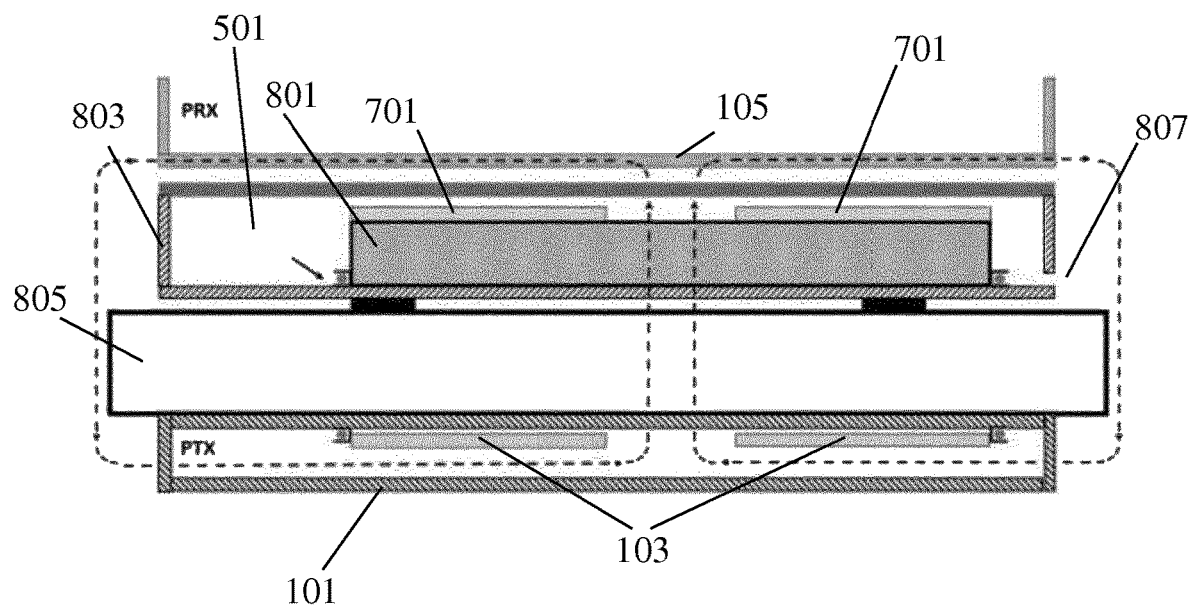
FIG. 8 is an illustration of a cross sectional view of a wireless power transfer arrangement comprising an intermediate device having a power repeater in accordance with some embodiments of the invention.

A possible approach is illustrated in FIG. 8 in which the repeater coil 701 is disposed on a support element 801 within an enclosure 803 of the intermediate device 501. In the example, the intermediate device 501 is placed on an element 805 (such as a counter or table top) below which a power transmitter 101 with the transmitter coil 103 is mounted. The opposing surface/wall of the intermediate device 501 supports an electromagnetic load 105 in the form of a simple heating element of a pan. In the example, the enclosure comprises one or more vents or air outlets 807 that allows heated air to escape thereby providing an element of cooling for the coil 701. However, for even relatively low power levels, this cooling is insufficient and results in unacceptable heating.

Figure 9:
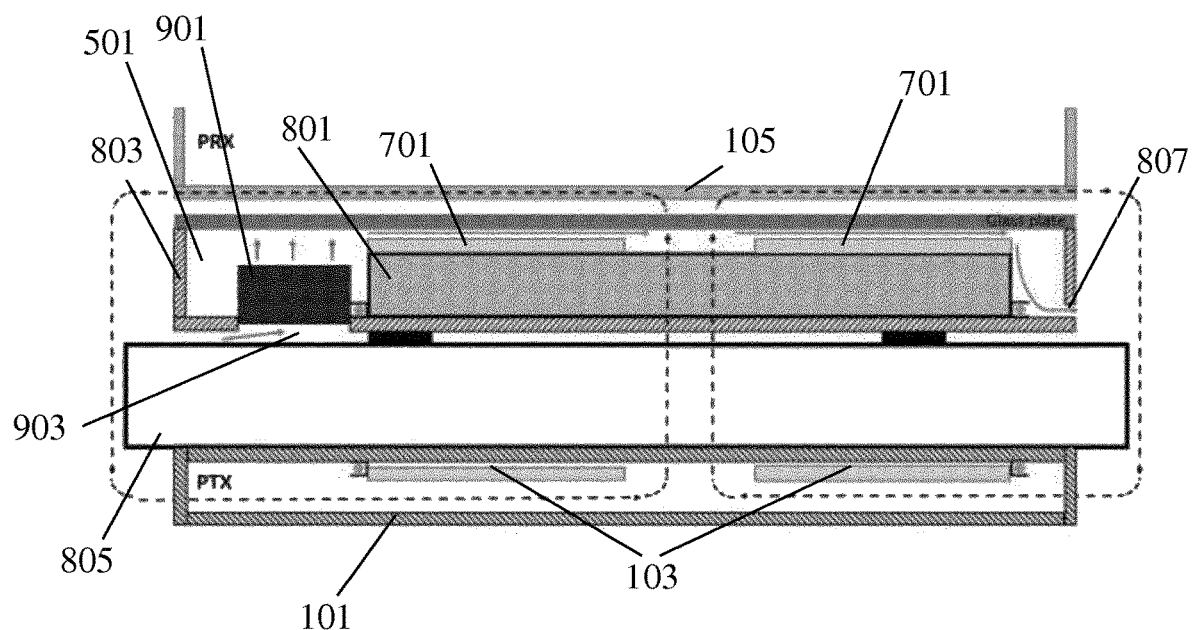
FIG. 9 is an illustration of a cross sectional view of a wireless power transfer arrangement comprising an intermediate device having a power repeater in accordance with some embodiments of the invention.

A modification of this is shown in FIG. 9. In this example, a fan 901 is introduced to suck air into the enclosure from an enclosure air inlet 903 resulting in an air flow across the coil 701 to the enclosure air outlet 807 thereby providing a more active and efficient cooling of the coil 701.

Although the approach may allow low complexity implementation in many systems, an important disadvantage of this cooling system is that the heat distribution across the repeater coil area is not homogenous. In particular, the approach tends to cause hotspot at parts of the coil 701 remote from the fan 901 thereby limiting the maximum operation distance between the cordless power transmitter and the intermediate device 501/electromagnetic load 105. Furthermore, in many situations, the support element 801 can become undesirably hot.

Figure 10:
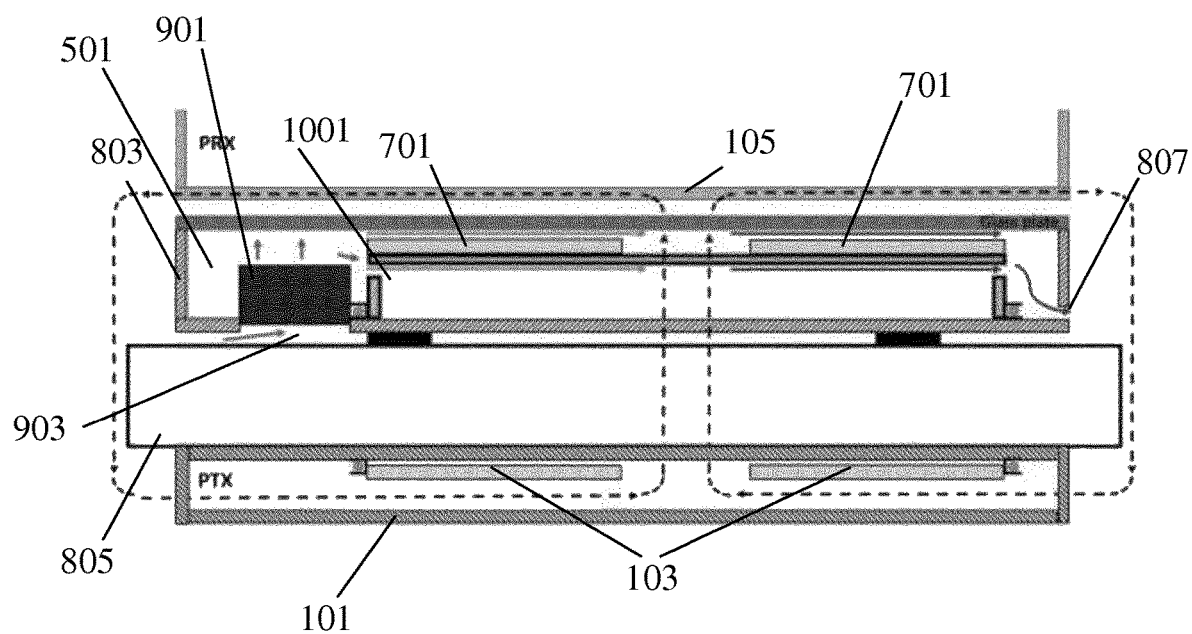
FIG. 10 is an illustration of a cross sectional view of a wireless power transfer arrangement comprising an intermediate device having a power repeater in accordance with some embodiments of the invention.

In the example of FIG. 10, the solid support element 801 has been replaced by a hollow support structure 1001 allowing an air flow below the coil. Although this may reduce the temperature of the support structure 1001 relative to the support element 801 of the previous examples, the heat distribution tends to still not be homogeneous. Another disadvantage is that the air flow design is relatively complicated.

Figure 11:
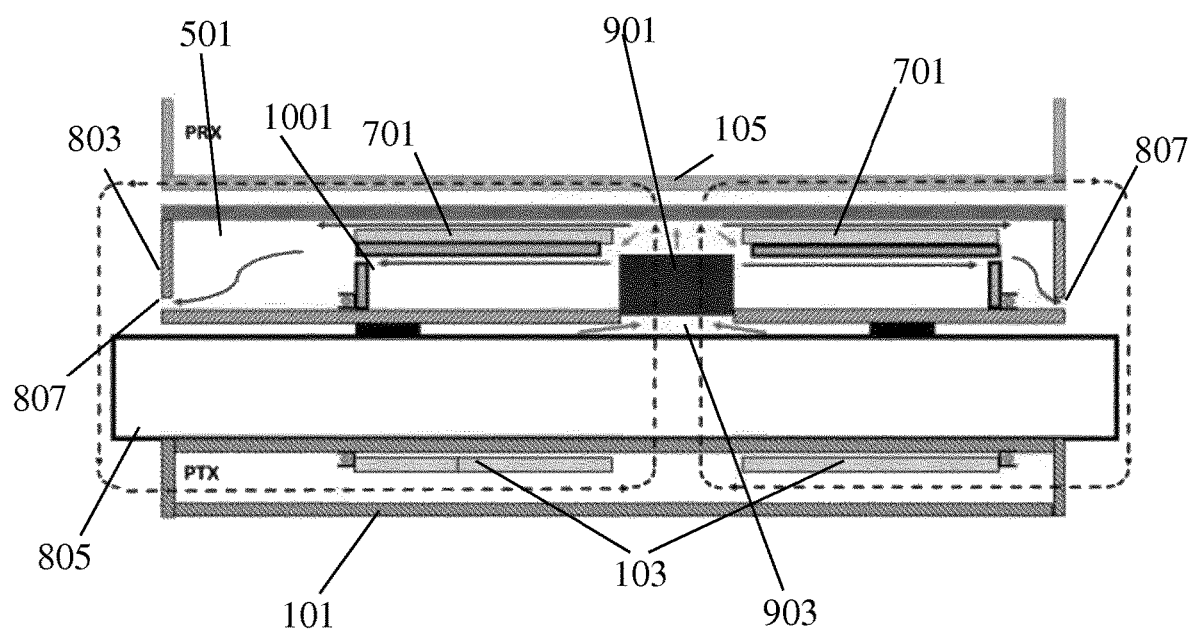
FIG. 11 is an illustration of a cross sectional view of a wireless power transfer arrangement comprising an intermediate device having a power repeater in accordance with some embodiments of the invention.

The design may be modified as illustrated in FIG. 11 where the fan 901 has been moved to the middle of the coil 701 with symmetric air outlets from both the hollow structure 1001 and the device enclosure 803. This may provide a more homogeneous and symmetrical air flow resulting in a more homogeneous temperature distribution across both the repeater coil area and the support structure 1001. However, a significant disadvantage is that the fan itself may be heated unacceptably. Indeed, the strong magnetic flux (black dotted line) from the power transmitter, will cause power dissipation in metal parts of the fan 901 (Eddy currents, hysteresis losses etc. in bearings, windings etc.) Furthermore, the air flow design is still complicated.

Figure 12:
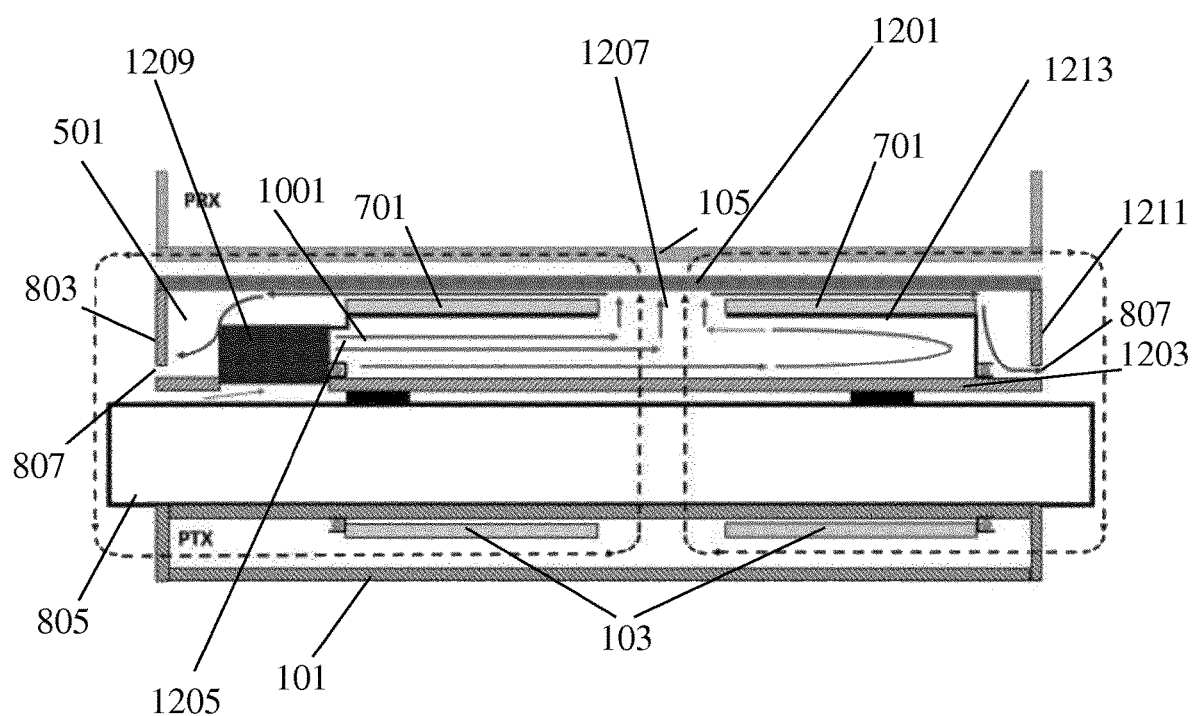
FIG. 12 is an illustration of a cross sectional view of a wireless power transfer arrangement comprising an intermediate device having a power repeater in accordance with some embodiments of the invention.

FIG. 12 illustrates a device in accordance with some embodiments of the invention. Similarly, to the approach of FIGS. 10 and 11, the intermediate device 501 comprises a hollow support structure 1001 on which the repeater coil 701 is mounted. The intermediate device 501 has device enclosure 803 in which the hollow support structure 1001 and the repeater coil 701 are comprised, and indeed typically all functionality of the intermediate device 501 is comprised within the device enclosure 803. In the example, the device enclosure has opposing sides or walls where a first enclosure wall 1201 is arranged to receive the electromagnetic load 105 and a second enclosure wall 1203 is arranged to be positioned towards the power transmitter 101, and e.g. to be in contact with the power transmitter 101 either directly or via an intervening object such as the element 805 (e.g. a worksurface or counter).

In the example, the repeater coil 701 thus couples to the electromagnetic load 105 via a first enclosure wall/side 1201 of the enclosure and to the power transmitter 101 via a second, opposite enclosure wall/side 1203. The resonance circuit (507) and repeater coil 701 electromagnetically couple to the power transmitter 101 via a second enclosure wall/side 1203 and to the electromagnetic load 105 via a first enclosure wall/side 1201. The resonance circuit (507) concentrates the energy of the power transfer electromagnetic signal from the power transmitter (201) towards the electromagnetic load (505).

The hollow support structure 1001 has a laterally positioned air inlet 1205 and a centrally positioned air outlet 1207. An air flow generator 1209 (typically a fan) is arranged to create an air flow into the air inlet 1205 resulting in the air flow entering the hollow interior of the hollow support structure 1001. The air will exit the hollow interior through the air outlet 1207 thereby causing an air flow in the interior of the hollow support structure 1001. The arrangement has been found to provide a substantially improved thermal design with a substantial reduction of thermal hotspots. It has been found that the arrangement of a lateral air inlet and central air outlet provides for a more homogenous cooling of a repeater coil 701. At the same time, the air flow generator 1209 is not exposed to a high electromagnetic field and thus can comprise metallic parts without large Eddy currents being induced. Thus, power dissipation in, and heating of, the air flow generator 1209 becomes much less problematic.

The intermediate device 501 of FIG. 12 further comprises an air flow guide opposing the air outlet and directing the air flow exciting the air outlet 1207 over the repeater coil 701. In the example of FIG. 12, the air flow guide is formed by the first side or wall 1201 of the enclosure 803. Thus, in the example, the hollow support structure 1001, the air outlet 1207, and the first enclosure wall 1201 are arranged such that the air exiting from the air outlet 1207 is directed across the repeater coil 701 by the first enclosure wall 1201.

In many embodiments, such as the one illustrated in FIG. 12, the hollow support structure 1001 is at least partially formed by opposing walls connected by a side wall 1211. The opposing walls comprise a first wall 1213 that supports the repeater coil 701 and on which the repeater coil 701 is disposed/mounted (typically attached to). The first wall 1213 will subsequently also be referred to as the support wall 1213.

The second wall of the opposing walls are in the example formed by the second enclosure wall 1203. This may allow a lower complexity and cost implementation, but it will be appreciated that in other embodiments, a separate second wall of the hollow support structure 1001 may be employed. The second opposing wall of the hollow support structure 1001 will in the following be referred to as the base wall, and will specifically be identical to the second enclosure wall 1203 (or the part of this which forms the hollow support structure 1001 with the support wall 1213 and the side wall 1211).

Typically, the support wall 1213 and the base wall 1203 will be substantially parallel to each other but it will be appreciated that this is not necessary or essential and that many other structures can be envisaged. The support wall 1213 and the base wall 1203 are in the example connected by a side wall 1211. In embodiments where the support wall 1213 and the base wall 1203 are substantially parallel, the side wall 1211 may typically be substantially orthogonal to both.

It will be appreciated that some or all of the walls may be formed together as integrated parts of a single physical element or may be formed by one or more individual elements that are then connected together. For example, in FIG. 12, the support wall 1213 and the side wall 1211 may be formed as a single molding that can be attached to the bottom of the enclosure, and specifically the second enclosure wall 1203 thereby forming the hollow support structure 1001.

In the example, the air outlet 1207 is formed in the support wall 1213 such that the direction of the air exiting the hollow support structure 1001 has a strong component orthogonal to the support wall 1213 and indeed in many embodiments the average air flow may be substantially orthogonal to the support wall 1213. The air flow guide, and in this case specifically the first enclosure wall 1201, is arranged to redirect the airflow to be along the support wall 1213 such that it flows over the repeater coil 701. In the example, the air flow guide/first enclosure wall 1201 is arranged to be substantially parallel to the support wall 1213 and is opposite the air outlet 1207 such that the air exiting the air outlet 1207 will hit the first enclosure wall 1201 and be deflected in a sideways direction. Thus, in the example, the support wall 1213 and the air flow guide/first enclosure wall 1201 form an air conduit or channel that leads the air from the air outlet 1207 across the repeater coil 701. The air then exits the conduit laterally to/outside the repeater coil 701. The air flow from this cooling conduit may then exit the device enclosure, e.g. through suitable vents 807.

In many embodiments, the hollow support structure 1001, the air outlet 1207 and the air flow guide may be arranged to be symmetric with respect to the repeater coil 701 such that the air flow is homogenous in different directions. Specifically, the support wall 1213, the air flow guide and the air outlet 1207 may be rotationally symmetric around a center point of the repeater coil 701. This may provide a homogenous air flow across the repeater coil 701 and reduce or prevent hot spots emerging.

In the approach of FIG. 12, the repeater coil 701 is disposed on the outside of a support wall 1213, and thus is disposed on the exterior of the hollow support structure 1001. The air outlet 1207 is formed centrally with respect to the repeater coil 701, and specifically is formed in the support wall 1213 inside the windings of the repeater coil 701. In most embodiments, the center of the air outlet 1207 is arranged to coincide with the center of the (windings of) the repeater coil 701.

The air inlet 1205 is formed laterally with respect to the repeater coil 701 and is specifically formed such that it is outside the (windings of) the repeater coil 701. The air inlet 1205 may typically be formed outside an external periphery of the repeater coil 701.

Specifically, if a cylinder were formed with a curved wall corresponding to the outer(most) winding of the repeater coil 701 (or more generally a three-dimensional region having a cross section corresponding to the outer winding of the repeater coil 701) the air inlet 1205 would be formed in the hollow support structure 1001 outside this cylinder (region). If a cylinder were formed with a curved wall corresponding to the inner(most) winding of the repeater coil 701 (or more generally a three-dimensional region having a cross section corresponding to the inner winding), the air outlet 1207 would be formed in the hollow support structure 1001 inside of this cylinder (region).

In many embodiments, such as the one of FIG. 12, the air inlet 1205 may be formed directly in the side wall of the hollow support structure 1001. This may in many embodiments provide a lower complexity and easier to implement structure and may further provide an advantageous air flow in the hollow support structure 1001.

It will be appreciated that in some embodiments, the hollow support structure 1001 may comprise a plurality of air outlets. However, in the example of FIG. 12 the only air outlet is the one formed in the support wall 1213, and further only one air outlet is formed in the support wall 1213. This results in a low complexity structure, arrangement, and thermal design. It may further maximize the air flow over the repeater coil 701 and may provide a more efficient cooling effect.

In the example, the hollow support structure comprises only a single air inlet and a single air outlet. In other embodiments, more air inlets and/or air outlets may be comprised in the hollow support structure. However, in many embodiments, the restriction to a single air inlet and/or a single air outlet may provide improved air flow and cooling. Additionally or alternatively, it may provide a mechanically more stable or lower complexity arrangement and intermediate device 501.

Figure 13:
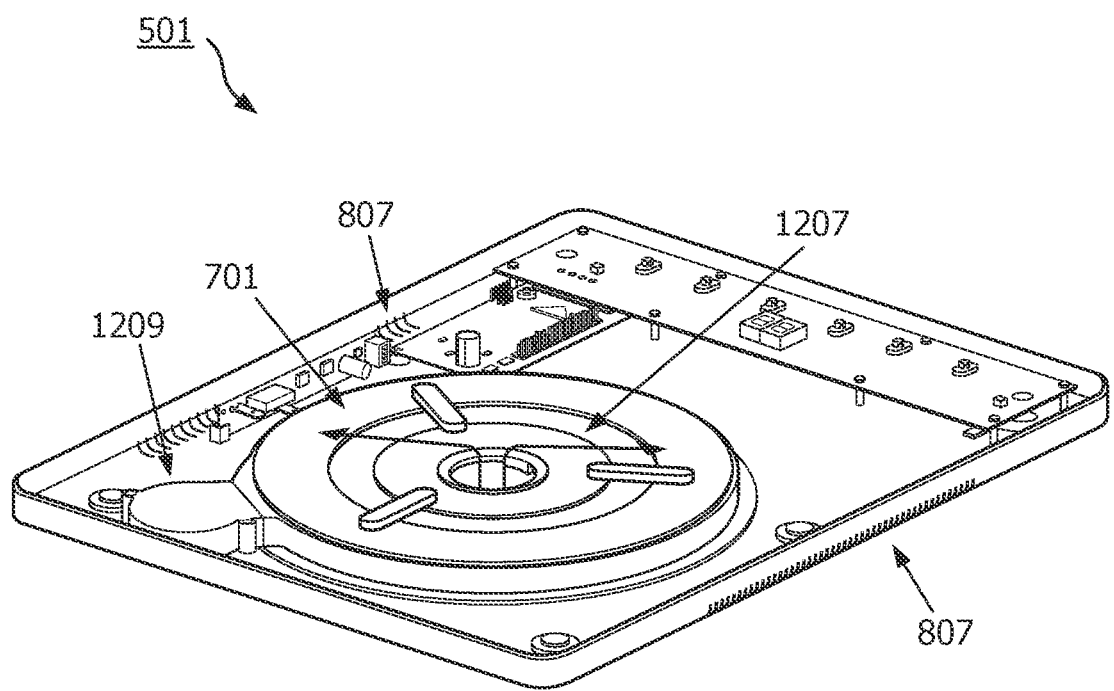
FIG. 13 is an illustration of an intermediate device with a power repeater for a wireless power transfer arrangement in accordance with some embodiments of the invention.

FIG. 13 illustrates a perspective view of the intermediate device 501 of FIG. 12. In the intermediate device 501, the air flow generator (specifically a fan) is positioned at the side but the air flow flowing over the repeater coil 701 still originates in the "magnetic" middle of the repeater coil. Although the fan is at the side, the airflow in the hollow cavity of the hollow support structure 1001 and over the repeater coil 701 is able to effectively remove heat from the repeater coil 701 (including from below). Further. the airflow design is not complicated and indeed is achieved by a relatively low complexity structure and arrangement.

In particular, due to the air outlet being in the magnetic middle of the coil, the air flow may become symmetric with respect to the repeater coil, resulting in a more homogeneous cooling and temperature distribution across the repeater coil.

Figure 14:
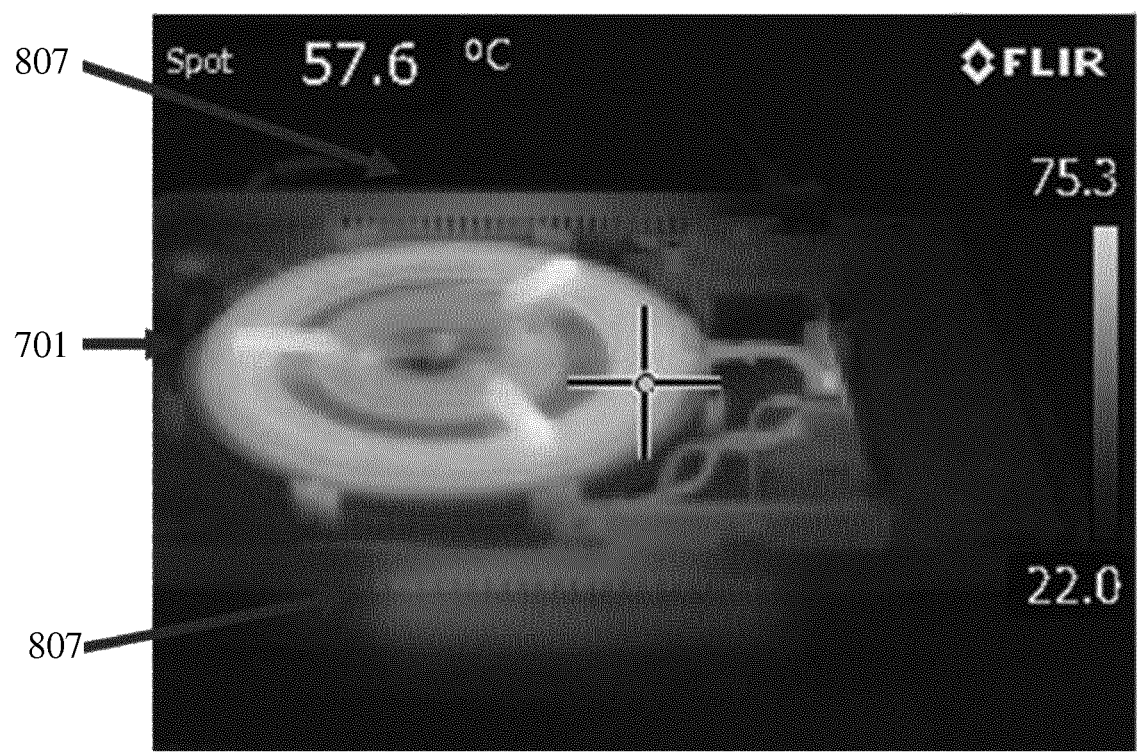
FIG. 14 is an illustration of a thermal image of an intermediate device with a power repeater for a wireless power transfer arrangement in accordance with some embodiments of the invention.

Furthermore, the fan is located in an area with a low magnetic flux density and as a result the metal parts (bearings, windings etc.) will not heat-up due to induced Eddy currents or hysteresis losses. FIG. 14 illustrates a thermal image of an intermediate device as described after 1-2 minutes operating at 2000 Watt. As can be seen, the temperate distribution across the repeater coil area is homogeneous. Visible as well is the temperature increase near the two air vents 807 of the enclosure.

In many embodiments, such as that illustrated in FIG. 12, the hollow support structure 1001 is substantially cylindrical and the repeater coil 701 is disposed on one of the flat surfaces of the hollow support structure. This may in many embodiments be particularly suited for repeater coils that are substantially circular. Further, it may typically provide a more homogenous air flow and reduce hot spots and provide improved cooling.

Figure 15:
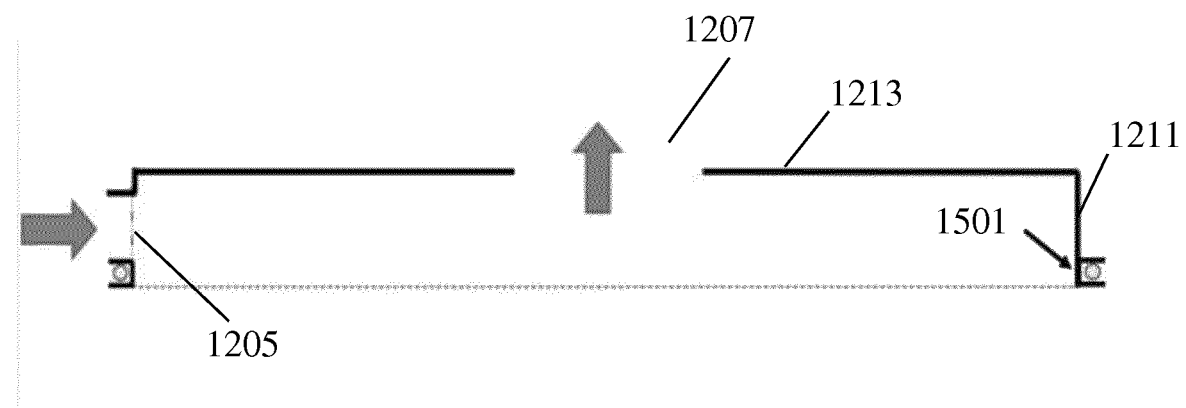
FIG. 15 is an illustration of a cross sectional view of a hollow support structure for an intermediate device with a power repeater for a wireless power transfer arrangement in accordance with some embodiments of the invention.

In many embodiments, the intermediate device 501 further comprises a communication coil/antenna which may be used to communicate with the power transmitter 101 (or indeed the power receiver 105). The communication coil may specifically be an NFC communication coil/antenna, and thus may be a winding of an NFC antenna. The incorporation of the hollow support structure 1001 may in particular be used not only to support the repeater coil 701 but may further be arranged to support the communication coil. In particular, as illustrated in FIG. 15, in many embodiments the support wall 1213 may support the repeater coil 701 whereas a side wall may be used to support a communication coil/antenna 1501.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A device comprising:
a resonance circuit, wherein the resonance circuit comprises a coil and a capacitor,
wherein the coil is arranged to electromagnetically couple to a power transmitter through a first surface area and to an electromagnetic load through a second surface area,
wherein the resonance circuit is arranged to concentrate energy of a power transfer electromagnetic signal from the power transmitter towards the electromagnetic load by concentrating energy of the power transfer electromagnetic signal from the first surface area towards the second surface area;
a hollow support structure having a laterally positioned air inlet and a centrally positioned air outlet,
wherein the coil is mounted on the hollow support structure,
wherein the coil is disposed around the central air outlet; and
an air flow generator arranged to create a flow of air into the air inlet; and
an air flow guide configured to provide an enclosure for the coil and the hollow support structure,
wherein the air flow guide includes a first surface that is configured to be parallel to a charging surface of the electromagnetic load during operation, and
wherein the air flow guide includes at least one opening in a surface other than the first surface such that air flow is directed laterally across a surface of the coil and vented substantially away from the second surface area.

2. The device of claim 1,
wherein the hollow support structure is at least partially formed by opposing walls connected by a side wall,
wherein the opposing walls comprises a first wall and a second wall,
wherein the first wall has an outside surface,
wherein the first wall comprises the air outlet,
wherein the coil is disposed on the outside surface.

3. The device of claim 2, wherein the enclosure comprises the second wall.

4. The device of claim 2 wherein the air inlet is at least partially formed in the side wall.

5. The device of claim 2, wherein only the first wall comprises at least one air outlet.

6. The device of claim 2, further comprising a communication antenna, wherein the communication antenna is disposed around the side wall.

7. The device of claim 1,
wherein the coil has an external periphery,
wherein the air inlet is outside the external periphery.

8. The device of claim 1, wherein the hollow support structure comprises only a single air inlet.

9. The device of claim 1, wherein the hollow support structure comprises only a single air outlet.

10. The device of claim 1,
wherein the hollow support structure is substantially cylindrical,
wherein the hollow support structure has at least one flat surface,
wherein the coil is disposed on at least one flat surface.

11. The device of claim 1, wherein the air outlet is formed inside an innermost winding of the coil.

12. The device of claim 3, wherein the air inlet is at least partially formed in the side wall.

13. A method of supporting a power transfer to an electromagnetic load, the method comprising:
providing a resonance circuit, the resonance circuit comprising a coil and a capacitor,
wherein the coil is arranged to electromagnetically couple to a power transmitter through a first surface area and to the electromagnetic load through a second surface area,
wherein the resonance circuit is arranged to concentrate energy of a power transfer electromagnetic signal from the power transmitter towards the electromagnetic load by concentrating energy of the power transfer electromagnetic signal from the first surface area towards the second surface area;

providing a hollow support structure,
- wherein the hollow support structure has a laterally positioned air inlet and a centrally positioned air outlet,
- wherein the coil is mounted on the hollow support structure,
- wherein the coil is disposed around the central air outlet; and creating a flow of air into the air inlet; and providing an air flow guide as an enclosure for the coil and the hollow support structure, wherein the air flow guide includes a first surface that is configured to be parallel to a charging surface of the electromagnetic load during operation, and wherein the air flow guide includes at least one opening in a surface other than the first surface such that air flow is directed laterally across a surface of the coil and vented substantially away from the second surface area.

14. The method of claim 13, wherein the hollow support structure is at least partially formed by opposing walls connected by a side wall, wherein the opposing walls comprises a first wall and a second wall, wherein the first wall has an outside surface, wherein the first wall comprises the air outlet, wherein the coil is disposed on the outside surface.

15. The method of claim 13, wherein the coil has an external periphery, wherein the air inlet is outside the external periphery.

* * * * *